(12) United States Patent
Yamazaki et al.

(10) Patent No.: US 9,719,383 B2
(45) Date of Patent: Aug. 1, 2017

(54) NETWORK DEVICE AND COMMUNICATION CONTROL METHOD

(71) Applicant: KYOCERA CORPORATION, Kyoto (JP)

(72) Inventors: Chiharu Yamazaki, Ota-ku (JP); Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/768,417

(22) PCT Filed: Feb. 12, 2014

(86) PCT No.: PCT/JP2014/053200
§ 371 (c)(1),
(2) Date: Aug. 17, 2015

(87) PCT Pub. No.: WO2014/129357
PCT Pub. Date: Aug. 28, 2014

(65) Prior Publication Data
US 2016/0194986 A1    Jul. 7, 2016

Related U.S. Application Data

(60) Provisional application No. 61/766,536, filed on Feb. 19, 2013.

(51) Int. Cl.
*H04W 72/04*    (2009.01)
*F01M 11/12*    (2006.01)
(Continued)

(52) U.S. Cl.
CPC ............ *F01M 11/12* (2013.01); *F01M 5/001* (2013.01); *F01M 5/005* (2013.01);
(Continued)

(58) Field of Classification Search
CPC ...... H04W 72/04; H04W 8/26; H04W 76/023; H04W 76/02; H04W 76/08; H04W 72/02; H04L 5/0032
(Continued)

(56) References Cited

U.S. PATENT DOCUMENTS 9,215,693 B2 *  12/2015  Ahn ..................... H04W 72/04
2007/0105562 A1   5/2007  Ji
(Continued)

FOREIGN PATENT DOCUMENTS

JP    2009-515461 A    4/2009
JP    2011-120133 A    6/2011
(Continued)

OTHER PUBLICATIONS

International Search Report for PCT/JP2014/053200 dated Apr. 22, 2014.
(Continued)

*Primary Examiner* — Ajit Patel
*Assistant Examiner* — Julio Perez
(74) *Attorney, Agent, or Firm* — Studebaker & Brackett PC (57) ABSTRACT

A network device that is used in a mobile communication system that supports cellular communication in which a data path passes through a core network, and D2D communication that is direct device-to-device communication in which a data path does not pass through the core network, comprises: a control unit that sets a D2D radio resource that is ensured for the D2D communication from radio resources be available to the mobile communication system. The control unit changes an amount of the D2D radio resource such that the D2D radio resource reaches an appropriate amount.

4 Claims, 7 Drawing Sheets

(51) Int. Cl.
*F01M 5/00* (2006.01)
*F01M 11/00* (2006.01)
*F04B 39/02* (2006.01)
*F04B 53/18* (2006.01)
*H04W 92/18* (2009.01)
*H04W 76/02* (2009.01)

(52) U.S. Cl.
CPC ....... *F01M 11/0004* (2013.01); *F04B 39/023* (2013.01); *F04B 39/0207* (2013.01); *F04B 53/18* (2013.01); *H04W 72/04* (2013.01); *H04W 76/023* (2013.01); *H04W 92/18* (2013.01)

(58) Field of Classification Search
USPC .............. 455/450, 452.2, 453; 370/329–333
See application file for complete search history.

(56) References Cited

U.S. PATENT DOCUMENTS

| | | | | |
|---|---|---|---|---|
| 2010/0195582 | A1* | 8/2010 | Koskinen | H04L 5/0032 370/329 |
| 2011/0312331 | A1* | 12/2011 | Hakola | H04W 72/085 455/452.2 |
| 2013/0258996 | A1* | 10/2013 | Jung | H04W 72/1284 370/330 |
| 2014/0044024 | A1* | 2/2014 | Zou | H04W 76/023 370/280 |
| 2014/0254429 | A1* | 9/2014 | Wang | H04L 5/0037 370/254 |
| 2014/0256334 | A1* | 9/2014 | Kazmi | H04W 28/18 455/450 |
| 2015/0117239 | A1* | 4/2015 | Lindoff | H04W 72/08 370/252 |

FOREIGN PATENT DOCUMENTS

| | | |
|---|---|---|
| WO | 2012/037160 A1 | 3/2012 |
| WO | 2012/061251 A1 | 5/2012 |

OTHER PUBLICATIONS

Written Opinion for PCT/JP2014/053200 dated Apr. 22, 2014.
3rd Generation Partnership Project; Technical Specification Group Services and System Aspects; Feasibility study for Proximity Services (ProSe) (Release 12), 3GPP TR 22.803 v12.0.0 (Dec. 2012).

* cited by examiner

NETWORK DEVICE AND COMMUNICATION CONTROL METHOD

TECHNICAL FIELD

The present invention relates to a network device and a communication control method that are used in a mobile communication system that supports D2D communication.

BACKGROUND ART

In 3GPP (3rd Generation Partnership Project) which is a project aiming to standardize a mobile communication system, the introduction of Device to Device (D2D) communication is discussed as a new function after Release 12 (see Non Patent Document 1).

In the D2D communication, a plurality of neighboring user terminals perform direct communication without any intervention of a core network. That is, a data path of the D2D communication does not pass through the core network. On the other hand, a data path of normal communication (cellular communication) of a mobile communication system passes through the core network.

PRIOR ART DOCUMENT

Non-Patent Document

Non Patent Document 1: 3GPP technical report "TR 22.803 V12.0.0" December 2012

SUMMARY OF THE INVENTION

Radio resources be available to a mobile communication system are limited. Thus, when radio resources ensured for the D2D communication are too much, there is a problem that radio resources available in cellular communication are reduced, or the influence of interference between the cellular communication and the D2D communication becomes large.

On the other hand, when the radio resources ensured for the D2D communication are too small, there is a problem that it is difficult to effectively utilize the D2D communication.

Therefore, the present invention provides a network device and a communication control method that are capable of solving the aforementioned problems.

A network device according to an embodiment is used in a mobile communication system that supports cellular communication in which a data path passes through a core network, and D2D communication that is direct device-to-device communication in which a data path does not pass through the core network. The network device comprises: a control unit that sets a D2D radio resource that is ensured for the D2D communication from radio resources assigned to the mobile communication system. The control unit changes an amount of the D2D radio resource such that the D2D radio resource reaches an appropriate amount.

MODE FOR CARRYING OUT THE INVENTION

Overview of Embodiment

A network device according to the first embodiment to the third embodiment is used in a mobile communication system that supports cellular communication in which a data path passes through a core network, and D2D communication that is direct device-to-device communication in which a data path does not pass through the core network. The network device comprises: a control unit that sets a D2D radio resource that is ensured for the D2D communication from radio resources be available to the mobile communication system. The control unit changes an amount of the D2D radio resource such that the D2D radio resource reaches an appropriate amount.

The network device may be a base station or an upper node of a base station. The first embodiment to the third embodiment describes an example in which the network device is a base station.

In the first embodiment, the appropriate amount is decided in accordance with an amount of traffic that is transmitted by at least one of the cellular communication and the D2D communication.

In the second embodiment, the appropriate amount is decided in accordance with a QoS level required for traffic that is transmitted by at least one of the cellular communication and the D2D communication.

In the third embodiment, the appropriate amount is decided in accordance with a time zone.

In the first embodiment to the third embodiment, the network device manages one cell or a plurality of cells. The control unit changes the amount of the D2D radio resource in units of cells.

In the first embodiment to the third embodiment, when the amount of the D2D radio resource in a predetermined cell included in the one cell or the plurality of cells is changed, the control unit notifies a neighboring cell adjacent to the predetermined cell of information on the change.

In other embodiment, the network device is a user terminal controlling the D2D communication, in a cluster comprising a plurality of user terminals performing the D2D communication. The control unit changes the amount of the D2D radio resource in the cluster.

In other embodiment, when the amount of the D2D radio resource in the cluster is changed, the control unit notifies other user terminal belongs to other cluster different from the cluster information on the change.

In the first embodiment to the third embodiment, a communication control method is used in a mobile communication system that supports cellular communication in which a data path passes through a core network, and D2D communication that is direct device-to-device communication in which a data path does not pass through the core network. The communication control method comprises: a step A of setting, by a network device, a D2D radio resource that is ensured for the D2D communication from radio resources be available to the mobile communication system; and a step B of changing, by the network device, an amount of the D2D radio resource such that the D2D radio resource reaches an appropriate amount.

First Embodiment

Hereinafter, with reference to the accompanying drawings, description will be provided for an embodiment in a case where D2D communication is introduced to a mobile communication system (an LTE system) configured based on the 3GPP standards.

(LTE System)

Figure 1:
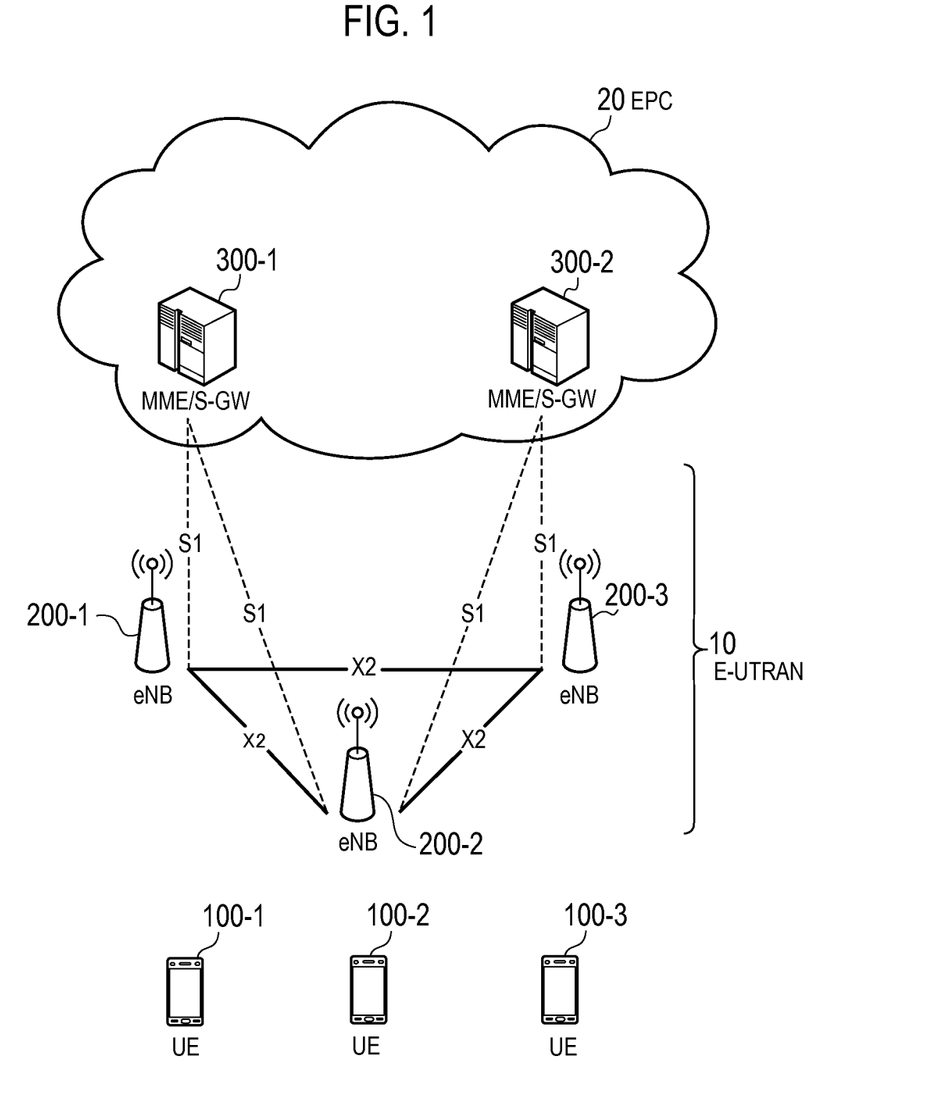
FIG. 1 is a configuration diagram of an LTE system according to a first embodiment to a third embodiment.

FIG. 1 is a configuration diagram of an LTE system according to the first embodiment. As illustrated in FIG. 1, the LTE system includes a plurality of UEs (User Equipments) 100, E-UTRAN (Evolved-Universals Terrestrial Radio Access Network) 10, and EPC (Evolved Packet Core) 20. The E-UTRAN 10 corresponds to a radio access network and the EPC 20 corresponds to a core network. The E-UTRAN 10 and the EPC 20 configure a network of the LTE system.

The UE 100 is a mobile communication device and performs radio communication with a cell (a serving cell) with which a connection is established. The UE 100 corresponds to a user terminal.

The E-UTRAN 10 includes a plurality of eNBs 200 (evolved Node-Bs). The eNB 200 corresponds to a base station. The eNB 200 manages one or a plurality of cells and performs radio communication with the UE 100 which establishes a connection with the cell of the eNB 200. It is noted that the "cell" is used as a term indicating a minimum unit of a radio communication area, and is also used as a term indicating a function of performing radio communication with the UE 100.

The eNB 200, for example, has a radio resource management (RRM) function, a function of routing user data, and a measurement control function for mobility control and scheduling.

The EPC 20 includes a plurality of MME (Mobility Management Entity)/S-GWs (Serving-Gateways) 300. The MME is a network node for performing various mobility controls and the like for the UE 100 and corresponds to a controller. The S-GW is a network node that performs control to transfer user data and corresponds to a mobile switching center. The EPC 20 including the MME/S-GW 300 accommodates the eNB 200.

The eNBs 200 are connected mutually via an X2 interface. Furthermore, the eNB 200 is connected to the MME/S-GW 300 via an S1 interface.

Next, the configurations of the UE 100 and the eNB 200 will be described.

Figure 2:
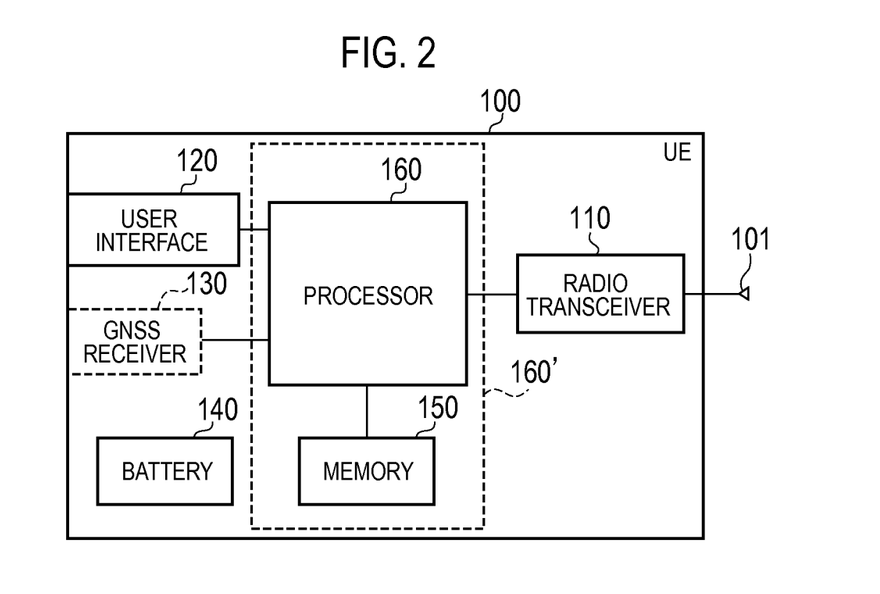
FIG. 2 is a block diagram of UE according to the first embodiment to the third embodiment.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 configure a control unit. The UE 100 may not have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
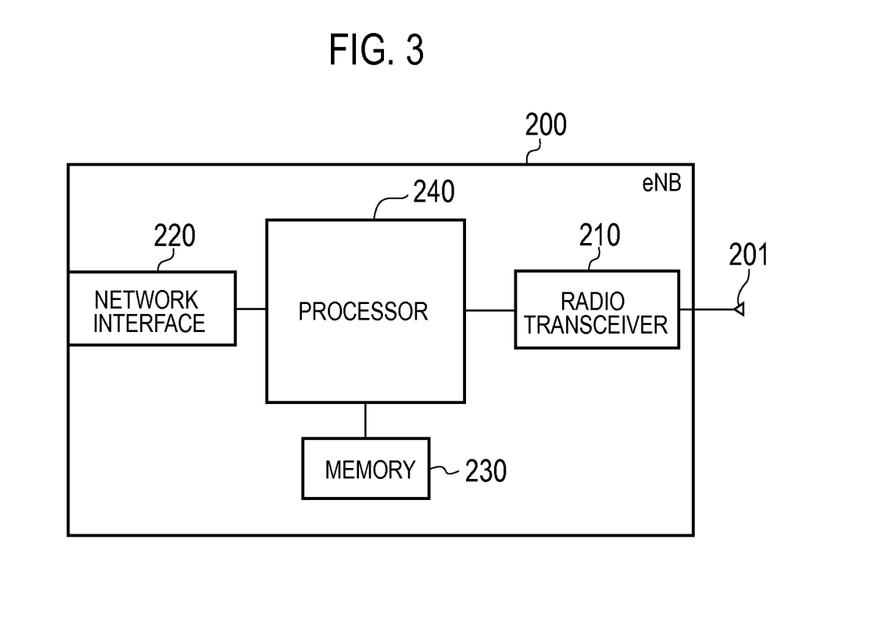
FIG. 3 is a block diagram of eNB according to the first embodiment to the third embodiment.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit. Furthermore, the memory 230 may be integrally formed with the processor 240, and this set (that is, a chip set) may be called a processor.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, encoding and decoding and the like on the baseband signal and a CPU that performs various processes by executing the program stored in the memory 230. The processor 240 executes various processes and various communication protocols described later.

Figure 4:
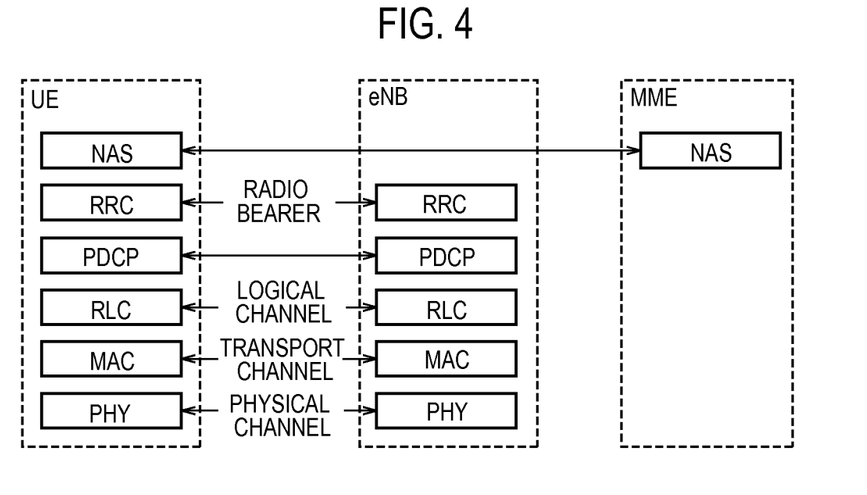
FIG. 4 is a protocol stack diagram of a radio interface in the LTE system.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY)

layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs priority control of data, and a retransmission process and the like by hybrid ARQ (HARQ). Between the MAC layer of the UE 100 and the MAC layer of the eNB 200, data is transmitted via a transport channel. The MAC layer of the eNB 200 includes a transport format of an uplink and a downlink (a transport block size and a modulation and coding scheme (MCS)) and a scheduler for determining a resource block to be assigned.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected state (an RRC connected state), and when there is no RRC connection, the UE 100 is in an idle state (an RRC idle state).

A NAS (Non-Access Stratum) layer positioned above the RRC layer performs session management, mobility management and the like.

Figure 5:
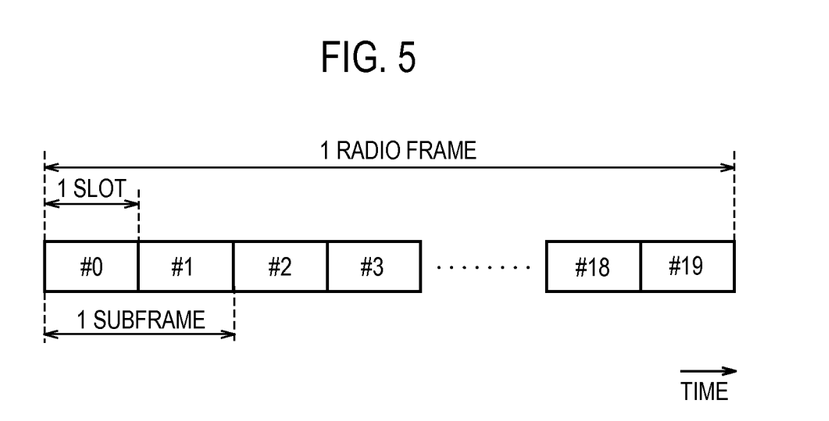
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction. Among radio resources assigned for the UE 100, a frequency resource can be specified by a resource block and a time resource can be specified by a subframe (or slot).

In the downlink, an interval of several symbols at the head of each subframe is a control region used as a physical downlink control channel (PDCCH) for mainly transmitting a control signal. Furthermore, the other interval of each subframe is a region available as a physical downlink shared channel (PDSCH) for mainly transmitting user data. Furthermore, in the downlink, reference signals, such as cell-specific reference signals (CRSs), are distributed and arranged in each subframe.

In the uplink, both ends in the frequency direction of each subframe are control regions used as a physical uplink control channel (PUCCH) for mainly transmitting a control signal. Further, the central portion in the frequency direction of each subframe is a region mainly capable of being used as a physical uplink shared channel (PUSCH) for transmitting user data.]

(D2D Communication)

The LTE system according to the first embodiment supports the D2D communication that is direct communication between UEs. Hereinafter, the D2D communication will be described in comparison with normal communication (cellular communication) of the LTE system.

In the cellular communication, a data path passes through the EPC 20 that is a core network. The data path indicates a communication path of user data (a user plane). On the other hand, in the D2D communication, the data path set between the UEs does not pass through the EPC 20. Thus, it is possible to reduce traffic load of the EPC 20.

The UE 100 discovers another UE 100 that exists in the vicinity of the UE 100, and starts the D2D communication. The D2D communication includes a direct communication mode and a locally routed mode.

Figure 6:
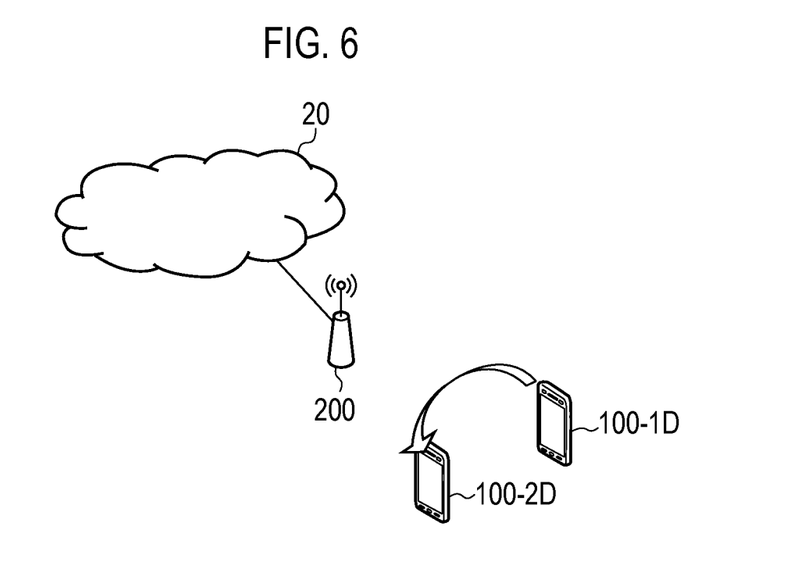
FIG. 6 is a diagram for explaining a direct communication mode in D2D communication.

FIG. 6 is a diagram for describing the direct communication mode in the D2D communication. As illustrated in FIG. 6, in the direct communication mode, a data path does not pass through the eNB 200. UE 100-1D and UE 100-2D adjacent to each other directly perform radio communication with low transmission power in a cell of the eNB 200. Thus, a merit including reduction of power consumption of the UE 100 and decrease of interference to a neighboring cell can be obtained.

Figure 7:
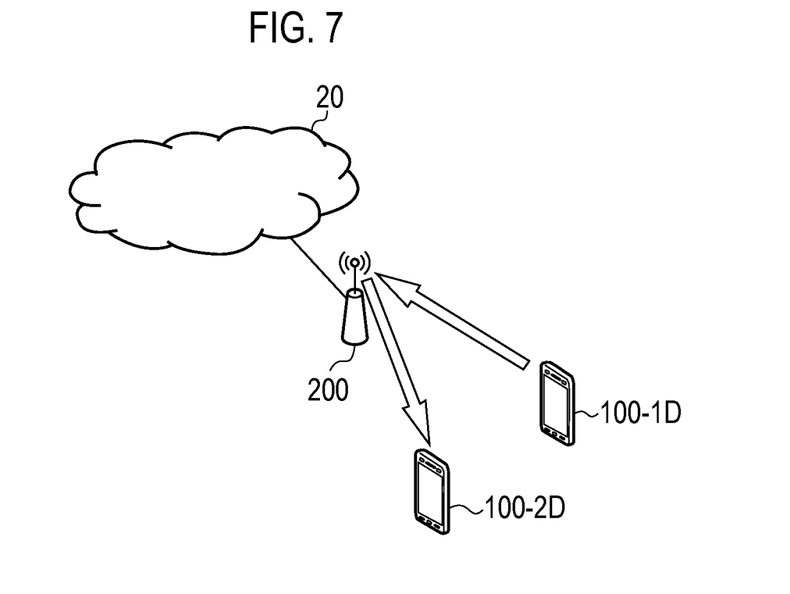
FIG. 7 is a diagram for explaining a locally routed mode in the D2D communication.

FIG. 7 is a diagram for describing the locally routed mode in the D2D communication. As illustrated in FIG. 7, in the locally routed mode, a data path passes through the eNB 200, however, does not pass through the EPC 20. That is, the UE 100-1D and the UE 100-2D perform radio communication via the eNB 200 without any intervention of the EPC 20 in a cell of the eNB 200. The locally routed mode is able to reduce traffic load of the EPC 20, however, has small merit as compared with the direct communication mode. Thus, in the first embodiment, the direct communication mode is mainly assumed.

(Operation According to First Embodiment)

In the first embodiment, the case, in which the D2D communication is performed in a frequency band (a licensed band) of the LTE system, is assumed. In such a case, the D2D communication is performed under the control of a network.

Figure 8:
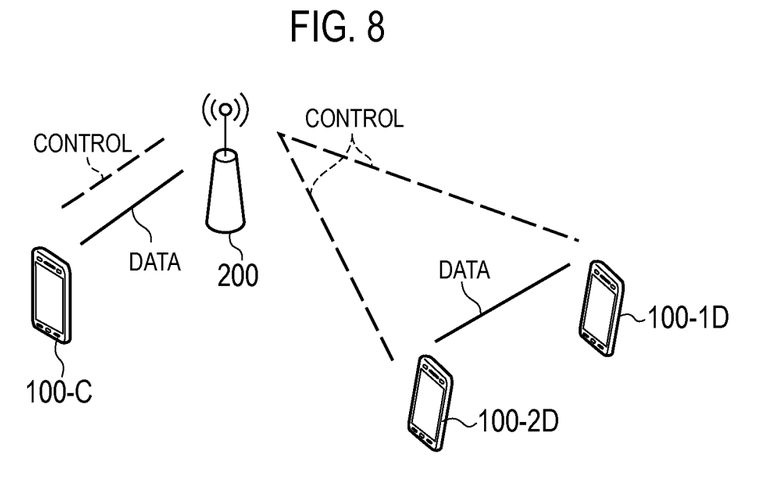
FIG. 8 is a diagram for describing an operation environment according to the first embodiment to the third embodiment.

FIG. 8 is a diagram for describing an operation environment according to the first embodiment. As illustrated in FIG. 8, UE 100-C is a cellular UE (a cellular terminal) that performs the cellular communication in a cell of the eNB 200. The cellular UE 100-C in a connected state performs the cellular communication by using a radio resource that is assigned from the eNB 200. The cellular UE 100-C exchanges user data and a control signal with the eNB 200.

The UE 100-1D and the UE 100-2D are D2D UEs (D2D terminals) that perform the D2D communication in the cell of the eNB 200. The D2D UE 100-1D and the D2D UE 100-2D in a connected state perform the D2D communication by using a radio resource that is assigned from the eNB 200. The D2D UE 100-1D and the D2D UE 100-2D exchange user data with each other, and exchange a control signal with the eNB 200.

As described above, in the first embodiment, the cellular UE 100-C and the D2D UE 100-D (the UE 100-1D and the UE 100-2D) camp on the same cell. However, the D2D UE, which is a part included in a D2D UE group that performs the D2D communication, may camp on another cell or may be located out of a service area.

When the D2D communication is performed in the frequency band of the LTE system, there are two schemes of a dedicated resource assignment scheme and a shared resource assignment scheme in order to ensure a radio resource for being assigned to the D2D communication.

Figure 9:
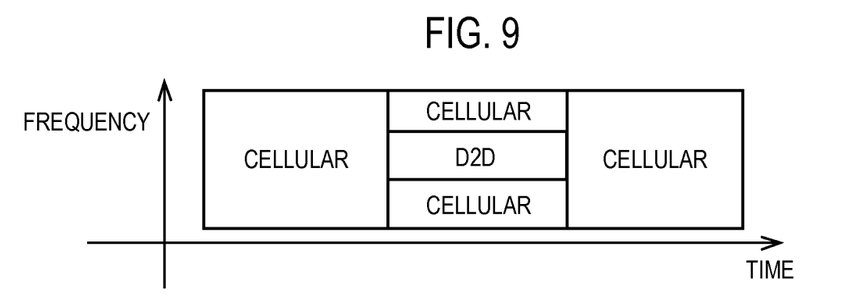
FIG. 9 is a diagram for describing the dedicated resource assignment scheme.

FIG. 9 is a diagram for describing the dedicated resource assignment scheme. As illustrated in FIG. 9, the dedicated resource assignment scheme is a scheme in which a radio resource for the D2D communication (a D2D radio resource) is not shared with a radio resource for the cellular radio resource (a cellular radio resource) that is assigned to the cellular communication. In the example of FIG. 9, among radio resources (specifically, time/frequency resources) corresponding to three subframes, several resource blocks positioned at the center in the central subframe are ensured as the D2D radio resource. In this case, the D2D radio resource is a radio resource dedicated for the D2D communication. According to the dedicated resource assignment scheme, it is possible to avoid interference between the cellular communication and the D2D communication, however, the cellular radio resource relatively decreases, and thus, there is a problem that the use efficiency of the radio resource is poor.

Figure 10:
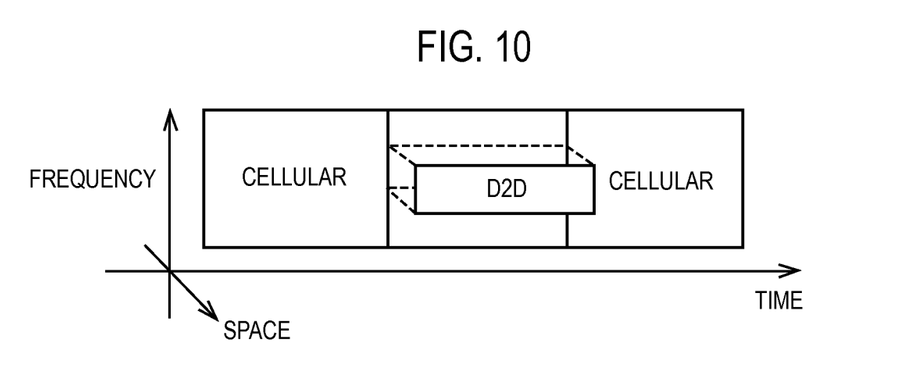
FIG. 10 is a diagram for describing the shared resource assignment scheme.

FIG. 10 is a diagram for describing the shared resource assignment scheme. As illustrated in FIG. 10, the shared resource assignment scheme is a scheme in which the D2D radio resource is shared with the cellular radio resource. In the example of FIG. 10, among radio resources corresponding to three subframes, several resource blocks positioned at the center in the central subframe are also used as the D2D radio resource as well as the cellular radio resource. In this case, the D2D radio resource is a radio resource shared with the cellular communication. The D2D radio resource is spatially separated from the cellular radio resource. According to the shared resource assignment scheme, the use efficiency of the radio resource is high, however, there is a problem that interference easily occurs between the cellular communication and the D2D communication, that is, communication quality easily deteriorates.

In addition, in any one of the dedicated resource assignment scheme and the shared resource assignment scheme, there are the case in which the D2D radio resources are provided in uplink cellular radio resources, the case in which the D2D radio resources are provided in downlink cellular radio resources, and the case in which these two cases are used together. Hereinafter, the case, in which the D2D radio resources are provided in the uplink cellular radio resources, is mainly assumed.

In the first embodiment, the eNB 200 sets the D2D radio resources that are ensured for the D2D communication, by the dedicated resource assignment scheme or the shared resource assignment scheme. Then, the eNB 200 assigns a radio resource to the D2D UE 100-D from the ensured D2D radio resources.

In this case, when the D2D radio resources are too much in the dedicated resource assignment scheme, radio resources available in the cellular communication are reduced. Furthermore, when the D2D radio resources are too much in the shared resource assignment scheme, the influence of interference between the cellular communication and the D2D communication becomes large. On the other hand, when the D2D radio resources are too small in the dedicated resource assignment scheme or the shared resource assignment scheme, it is difficult to effectively utilize the D2D communication.

In this regard, the eNB 200 changes the amount of the D2D radio resources such that the D2D radio resources reach an appropriate amount. In the first embodiment, the appropriate amount of the D2D radio resources is decided in accordance with the amount of traffic that is transmitted by the cellular communication and/or the D2D communication. In this case, the traffic mainly indicates user data.

Each cellular UE 100-C in a connected state in the cell of the eNB 200 transmits, to the eNB 200, a buffer status report (BSR) indicating the transmission buffer amount of the cellular UE 100-C (that is, the amount of traffic to be transmitted). The eNB 200 accumulates transmission buffer amounts indicated by BSRs with respect to each cellular UE 100-C, thereby recognizing an amount of traffic that is transmitted by the cellular communication (hereinafter, a cellular traffic amount). In addition, when the D2D radio resources are provided in the downlink cellular radio resources, it is sufficient if the eNB 200 recognizes the transmission buffer amount of the eNB 200 as the cellular traffic amount.

Furthermore, each D2D UE 100-D in the connected state in the cell of the eNB 200 transmits, to the eNB 200, a D2D buffer status report (D2D-BSR) indicating the transmission buffer amount of the D2D UE 100-D. The eNB 200 accumulates transmission buffer amounts indicated by D2D-BSRs with respect to each D2D UE 100-D, thereby being able to recognize an amount of traffic that is transmitted by the D2D communication (hereinafter, a D2D traffic amount).

For example, in a first method, the eNB 200 reduces the amount of the D2D radio resources (hereinafter, a D2D radio resource amount) when the D2D traffic amount is small, and increases the D2D radio resource amount when the D2D traffic amount is large.

Alternatively, in a second method, the eNB 200 increases the D2D radio resource amount when the cellular traffic amount is small, and reduces the D2D radio resource amount when the cellular traffic amount is large.

Alternatively, in a third method, the eNB 200 reduces the D2D radio resource amount when a ratio of the D2D traffic amount with respect to a total traffic amount is small, and increases the D2D radio resource amount when the ratio is large.

Figure 11:
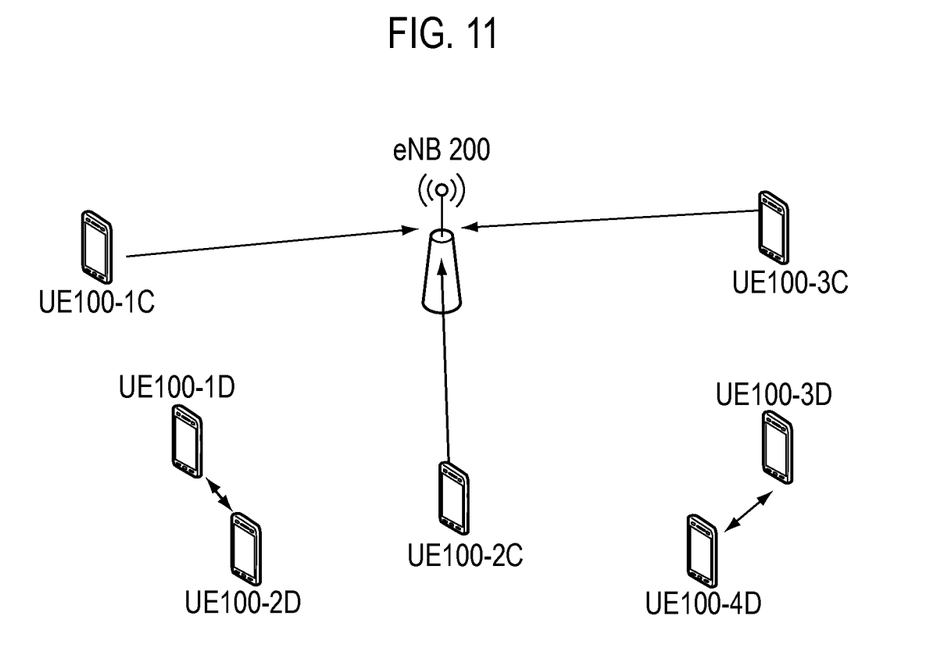
FIG. 11 is a diagram for describing a method of controlling the D2D radio resource amount according to the first embodiment to the third embodiment.

FIG. 11 is a diagram for describing a method of controlling the D2D radio resource amount according to the first embodiment. Hereinafter, a specific example of the aforementioned third method will be described.

As illustrated in FIG. 11, in the cell of the eNB 200, a cellular UE 100-1C to a cellular UE 100-3C are performing cellular communication, and a D2D UE 100-1D to a D2D UE 100-4D are performing D2D communication.

Firstly, the eNB 200 recognizes a cellular traffic amount (a total transmission buffer amount) on the basis of BSR that is received from each cellular UE 100-C. Furthermore, the eNB 200 recognizes a D2D traffic amount (a total transmission buffer amount) on the basis of D2D-BSR that is received from each D2D UE 100-D.

Secondly, the eNB 200 calculates the sum of the cellular traffic amount and the D2D traffic amount as a total traffic amount. Then, the eNB 200 calculates a ratio P of the D2D traffic amount with respect to the total traffic amount (=the D2D traffic amount/the total traffic amount).

Thirdly, the eNB 200 compares the calculated ratio P with a threshold value and decides a D2D radio resource amount in accordance with a comparison result. The number of the threshold values differs according to the number of steps in which the D2D resource amount is changed. For example, when the D2D radio resource amount is changed in three steps of R0, R1, and R2 (R0<R1<R2), two threshold values of Th0 and Th1 (Th0<Th1) are provided, so that it is possible to decide the D2D radio resource amount according to the following method in which $R0 (P<Th0)$ $R1 (Th0 \leq P<Th1)$ $R2 (Th1 \leq P).$ Alternatively, in the case in which three resources A, B, and C are prepared as candidates of the D2D radio resources, the following method may be adopted in which
(A is ON when P<Th0),
(A and B are ON when Th0≤P≤Th1), and
(A, B, and C are ON when Th1≤P).

Fourthly, when the decided D2D radio resource amount is different from an amount up to now, the eNB 200 changes the D2D radio resource amount to the decided amount.

Accordingly, according to the first embodiment, the eNB 200 is able to set the D2D radio resource amount as an appropriate amount in accordance with a traffic situation, so that it is possible to improve the overall throughput of the cellular communication and the D2D communication. Furthermore, the eNB 200 changes the D2D radio resource amount in units of cells, so that it is possible to optimize the D2D radio resource amount for each cell.

Second Embodiment

Hereinafter, the second embodiment will be described while focusing on the differences from the aforementioned first embodiment. Similarly to the first embodiment, the eNB 200 according to the second embodiment changes the amount of the D2D radio resources such that the D2D radio resources reach an appropriate amount.

However, in the second embodiment, the appropriate amount of the D2D radio resources is decided in accordance with a QoS (Quality of Service) level required for traffic that is transmitted by cellular communication and/or D2D communication. Other points are the same as those of the first embodiment.

A method of controlling the D2D radio resource amount according to the second embodiment will be described with reference to FIG. 11.

Firstly, each cellular UE 100-C in a connected state in the cell of the eNB 200 transmits, to the eNB 200, BSR indicating a transmission buffer amount for each QoS level required for the traffic of the cellular UE 100-C. Furthermore, each D2D UE 100-D in a connected state in the cell of the eNB 200 transmits, to the eNB 200, D2D-BSR indicating a transmission buffer amount for each QoS level required for the traffic of the D2D UE 100-D.

Secondly, on the basis of BSRs received from each cellular UE 100-C, the eNB 200 accumulates transmission buffer amounts (for example, real time packet amounts) having a QoS level equal to or more than a predetermined level, and recognizes a high QoS cellular traffic amount. Furthermore, on the basis of D2D-BSRs received from each D2D UE 100-D, the eNB 200 accumulates transmission buffer amounts having a QoS level equal to or more than a predetermined level, and recognizes a high QoS D2D traffic amount.

Thirdly, the eNB 200 calculates the sum of the high QoS cellular traffic amount and the high QoS D2D traffic amount as the total high QoS traffic amount. Then, the eNB 200 calculates a ratio P (=the high QoS D2D traffic amount/the total high QoS traffic amount) of the high QoS D2D traffic amount with respect to the total high QoS traffic amount.

Fourthly, the eNB 200 compares the calculated ratio P with a threshold value and decides a D2D radio resource amount in accordance with a comparison result. The number of the threshold values differs according to the number of steps in which the D2D resource amount is changed. For example, when the D2D radio resource amount is changed in three steps of R0, R1, and R2 (R0<R1<R2), two threshold values of Th0 and Th1 (Th0<Th1) are provided, so that it is possible to decide the D2D radio resource amount according to the following method in which $R0 (P<Th0)$ $R1 (Th0 \leq P<Th1)$ $R2 (Th1 \leq P).$ Alternatively, in the case in which three resources A, B, and C are prepared as candidates of the D2D radio resources, the following method may be adopted in which
(A is ON when P<Th0),
(A and B are ON when Th0≤P≤Th1), and
(A, B, and C are ON when Th1≤P).

Fifthly, when the decided D2D radio resource amount is different from an amount up to now, the eNB 200 changes the D2D radio resource amount to the decided amount.

Accordingly, according to the second embodiment, the eNB 200 is able to set the D2D radio resource amount as an appropriate amount in accordance with a situation of high QoS traffic, so that it is possible to improve the overall throughput of the cellular communication and the D2D communication and to enhance user experience. Furthermore, the eNB 200 changes the D2D radio resource amount in units of cells, so that it is possible to optimize the D2D radio resource amount for each cell.

[Modification of Second Embodiment]

As well as a method of changing the D2D radio resource amount on the basis of the high QoS traffic amount (the high QoS transmission buffer amount), the following method may also be employed.

In the present modification, the eNB 200 changes the D2D radio resource amount on the basis of the number of cellular UE 100-Cs having traffic with a high QoS level required (hereinafter, a high QoS cellular UE number), and/or the number of D2D UE 100-Cs having traffic with a high QoS level required (hereinafter, a high QoS D2D UE number).

For example, the eNB 200 may also reduce the D2D radio resource amount when the high QoS D2D UE number is small, and increase the D2D radio resource amount when the high QoS D2D UE number is large. Alternatively, the eNB 200 may also increase the D2D radio resource amount when the high QoS cellular UE number is small, and reduce the D2D radio resource amount when the high QoS cellular UE number is large. Alternatively, similarly to the aforementioned second embodiment, the eNB 200 may also change the D2D radio resource amount in accordance with the ratio of the high QoS D2D UE number with respect to the total number of high QoS UEs.

In addition, in the present modification, the eNB 200 may not necessarily use the BSR (and the D2D-BSR). For example, since the UE 100 establishes a radio bearer corresponding to a QoS level, the eNB 200 may recognize the QoS level on the basis of bearer attributes of each UE 100.

Third Embodiment

Hereinafter, the third embodiment will be described while focusing on the differences from the aforementioned first embodiment.

Similarly to the first embodiment, the eNB 200 according to the third embodiment changes the amount of the D2D radio resources such that the D2D radio resources reach an appropriate amount.

However, in the third embodiment, the appropriate amount of the D2D radio resources is decided in accordance with a time zone. Other points are the same as those of the first embodiment.

A method of controlling the D2D radio resource amount according to the third embodiment will be described with reference to FIG. 11.

Firstly, the eNB 200 stores schedule information indicating a schedule of the D2D radio resource amount for each time zone. The schedule information may be set by an upper node of the eNB 200, or may be set in response to a user operation. Hereinafter, the case, in which the eNB 200 is an indoor base station (HeNB) that manages a small cell, is assumed. When a D2D-compatible UE is contracted and introduced as an extension for office and there is a contract including 08:00 to 21:00 (a D2D extension contract) and 21:00 to 08:00 (no D2D extension contract), it is planned that the D2D radio resource amount is to be large for 08:00 to 21:00 and is to be small for 21:00 to 08:00.

Secondly, the eNB 200 changes the D2D radio resource amount for each time zone on the basis of the stored schedule information.

Accordingly, according to the third embodiment, the eNB 200 is able to set the D2D radio resource amount to an appropriate amount by a simple method. In addition, the eNB 200 may employ a scheduled D2D radio resource amount as an initial value, and correct the initial value by using the method described in each of the aforementioned embodiments.

Other Embodiments

In each of the aforementioned embodiments, the case is described where the licensed band is one frequency band (band); however, this is not limiting. The licensed band may be a plurality of frequency bands. Specifically, when the eNB 200 manages a plurality of frequency bands (2-GHz band, 800-MHz band, etc.), the eNB 200 may set the D2D radio resource, out of radio resources over the plurality of frequency bands. For example, the eNB 200 may set, as the D2D radio resource, the radio resource in a frequency band (for example, 2-GHz band) different from the frequency band (for example, 800-MHz band) to which the cell in which the UE 100 exists belongs.

Further, in each of the aforementioned embodiments, the D2D radio resource is set from the radio resources in the frequency band (licensed band) of the LTE system; however, this is not limiting. For example, the D2D radio resource may be set from a radio resource in a frequency band (so-called unlicensed band) not assigned to a particular system including the mobile communication system, and a radio resource in a frequency band (so-called white space) not (actively) used. When these frequency bands are available in the LTE system, the eNB 200 may set the D2D radio resource from radio resources in these frequency bands (and/or the licensed bands) and change the amount of D2D radio resources so that the D2D radio resources reach an appropriate amount.

In each of the aforementioned embodiments, inter-cell cooperation has not been particularly mentioned. However, information on the D2D radio resource amount may be shared among cells. When the eNB 200 changes the D2D radio resource amount in the cell of the eNB 200, the eNB 200 notifies a cell adjacent to the cell of the eNB 200 (a neighboring cell) of information on the change. For example, the eNB 200 transmits information indicating a changed D2D radio resource amount to another eNB 200 that manages the neighboring cell, on the X2 interface or the S1 interface. When the information on the D2D radio resource amount is shared among cells, the D2D radio resource amount of the neighboring cell may be considered in determination regarding whether or not to change the D2D radio resource amount of the cell of the eNB 200, or determination of an appropriate D2D radio resource amount of the cell of the eNB 200. Alternatively, the eNB 200 recognizes the D2D radio resource amount in the neighboring cell, thereby being also able to estimate interference with cellular communication of the cell of the eNB 200.

Moreover, the information on the D2D radio resource amount shared among cells may include the location (a location in a time direction and a location in a frequency direction) of a D2D radio resource. In this way, when the location of a D2D radio resource of the cell of the eNB 200 (the cell 1) is decided, it is possible to consider the location of a D2D radio resource in the neighboring cell (the cell 2). Alternatively, when the location of a D2D radio resource may be requested to be changed from the cell 1 to the cell 2, and a determination result (Yes or No) in the cell 2 may be notified to the cell 1.

Each of the aforementioned embodiments has described an example in which the eNB 200 changes the amount of the D2D radio resources. However, the amount of the D2D radio resources may be changed by an upper node (for example, an MME) of the eNB 200.

Furthermore, each of the aforementioned embodiments has mainly described the direct communication mode in the D2D communication. However, instead of the direct communication mode or in addition to the direct communication mode, the locally routed mode may also be applied.

In each of the aforementioned embodiments, the plurality of D2D UEs are capable of sharing the D2D radio resource (the radio resource dedicated to the D2D communication and/or the radio resource shared with the cellular communication). Therefore, each of the plurality of D2D UEs is capable of performing D2D communication by using the D2D radio resources spatially separated to each other. Further, when there are a plurality of D2D UE clusters including a plurality of UEs adjacent to each other (hereinafter, referred to as "clusters"), the plurality of clusters are capable of similarly sharing the D2D radio resource. The UE that serves as a reference for synchronization in the cluster and that controls the D2D communication in the cluster is referred to as "cluster head".

The cluster head may set a radio resource ensured for the D2D communication in a cluster to which the cluster head belongs in accordance with a dedicated resource assignment scheme or a shared resource assignment scheme described below, out of radio resources dedicated to the D2D communication. Then, the cluster head may assign the radio resource to the D2D UE belonging to the cluster, out of the ensured radio resources.

Here, unlike in the above-described embodiments, the dedicated resource assignment scheme used by the cluster head is a scheme in which the radio resource for D2D communication (radio resource for a cluster) used in the cluster to which the cluster head belongs is not used commonly with the radio resource for D2D communication used in another cluster (radio resource for another cluster). On the other hand, unlike in the above-described embodiments, the shared resource assignment scheme used by the cluster head is a scheme in which the radio resource for a cluster is used commonly with the radio resource for another cluster.

The cluster head is capable of changing the amount of the radio resources for a cluster so that the radio resources for a cluster reach an appropriate amount. The appropriate amount of the radio resources for a cluster is defined, in much the same way as in each of the above-described embodiments, in accordance with at least one of: the amount of traffic transmitted by the D2D communication, QoS requested for the traffic transmitted by the D2D communication, and a time zone.

The cluster head may set, out of radio resources dedicated to the D2D communication, a radio resource ensured for the D2D communication in a predetermined UE, out of plurality of D2D UEs configuring a cluster to which the cluster head belongs, in accordance with a dedicated resource assignment scheme or a shared resource assignment scheme described below. Then, the cluster head may assign the radio resource to the D2D UE belonging to the cluster, out of the ensured radio resources.

The dedicated resource assignment scheme here is a scheme in which the radio resource for D2D communication used by a predetermined UE is not used commonly with the radio resource for D2D communication used by another UE belonging to the cluster. On the other hand, the shared resource assignment scheme is a scheme in which the radio resource for D2D communication used by a predetermined UE is used commonly with the radio resource for D2D communication used by another UE belonging to the cluster.

The cluster head is capable of changing the amount of the radio resources so that the radio resources for D2D communication used by a predetermined UE reach an appropriate amount, in much the same way as described above. It is noted that the cluster head is capable of assigning the radio resource when each of the plurality of D2D UEs configuring the cluster is regarded as a predetermined UE.

Further, in much the same way as in the above-described inter-cell cooperation, information on the D2D radio resource amount in the cluster may be shared among the clusters. The cluster head notifies another cluster different from the cluster (for example, an adjacent cluster) of the information on the change, when changing the D2D radio resource amount in the cluster to which the cluster head belongs. For example, a cluster head 100-1 transmits information indicating the changed D2D radio resource amount, by the D2D communication, to a cluster head 100-2 belonging to another cluster. Alternatively, the cluster head 100-1 may transmit the information indicating the changed D2D radio resource amount, by way of the eNB 200, to the cluster head 100-2.

When the information on the D2D radio resource amount is shared among the cluster, the cluster head 100-1 may take into consideration the D2D radio resource amount in another cluster when determining whether the D2D radio resource amount in its own cluster is to be changed or when determining the appropriate D2D radio resource amount in its own cluster. Alternatively, the cluster head 100-1 is also capable of estimating the interference with another cluster by recognizing the D2D radio resource amount in the other cluster.

Moreover, the information on the D2D radio resource amount shared among the cluster may include the location (a location in a time direction and a location in a frequency direction) of the D2D radio resource.

Each of the aforementioned embodiments has described an example in which the present invention is applied to the LTE system. However, the present invention may also be applied to systems, other than the LTE system, as well as the LTE system.

In addition, the entire content of U.S. Provisional Application No. 61/766,536 (filed on Feb. 19, 2013) is incorporated in the present specification by reference.

INDUSTRIAL APPLICABILITY

As described above, the network device and the communication control method according to the present invention can use D2D communication effectively, and thus they are useful for a mobile communication field.

The invention claimed is:

1. A base station that is used in a mobile communication system that supports cellular communication in which a data path passes through a core network, and D2D communication that is direct device-to-device communication in which a data path does not pass through the core network, the base station comprising:
 a controller configured to set D2D radio resources in a cell managed by the base station for the D2D communication from radio resources available to the mobile communication system, wherein the controller is further configured to change an amount of the D2D radio resources in the cell such that the D2D radio resources in the cell reaches an appropriate amount, wherein the appropriate amount is decided in accordance with an amount of traffic that is transmitted by at least one of the cellular communication and the D2D communication, and wherein the appropriate amount is decided in accordance with a time zone; and a transmitter configured to transmit D2D radio resource information to another base station, the D2D radio resource information indicating the changing on the D2D radio resources in the cell.

2. The base station according to claim 1, wherein
 the appropriate amount is decided in accordance with a QoS level required for traffic that is transmitted by at least one of the cellular communication and the D2D communication so as to enhance overall user experience.

3. A communication control method that is used in a mobile communication system that supports cellular communication in which a data path passes through a core network, and D2D communication that is direct device-to-device communication in which a data path does not pass through the core network, comprising:
 a step A of setting, by a base station, D2D radio resources in a cell managed by the base station for the D2D communication from radio resources available to the mobile communication system; and
 a step B of changing, by the base station, an amount of the D2D radio resources in the cell such that the D2D radio resources in the cell reaches an appropriate amount wherein the appropriate amount is decided in accordance with an amount of traffic that is transmitted by at least one of the cellular communication and the D2D communication, and wherein the appropriate amount is decided in accordance with a time zone, and
 a step of transmitting, by the base station, D2D radio resource information to another base station, the D2D radio resource information indicating the changing on the D2D radio resources in the cell.

4. The base station according to claim 1, wherein the appropriate amount being an amount that improves overall throughput for data passing through both D2D paths and cellular communication paths that use the core network, and the core network is an Evolved Packet Core (EPC).

* * * * *